No. 622,547. Patented Apr. 4, 1899.
A. SHEDLOCK & J. A. HUDSON.
SPRINKLING APPARATUS.
(Application filed Feb. 21, 1898.)
(No Model.) 2 Sheets—Sheet 1.
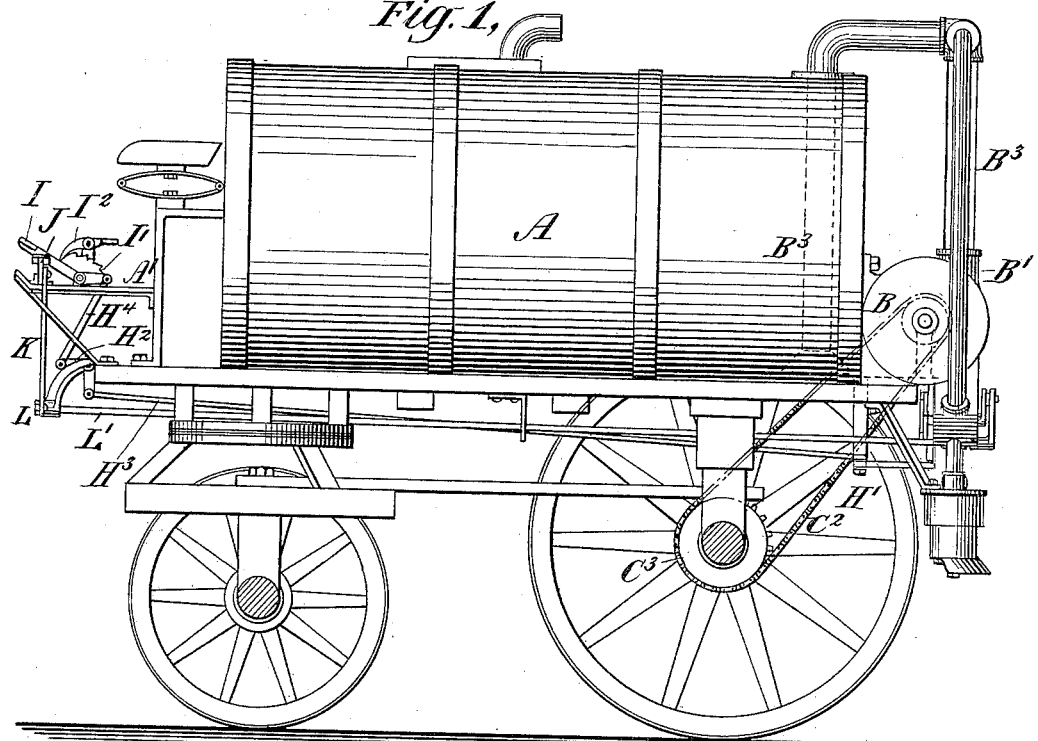
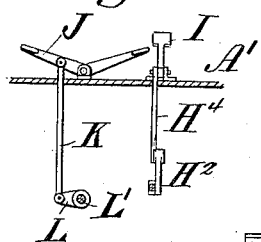
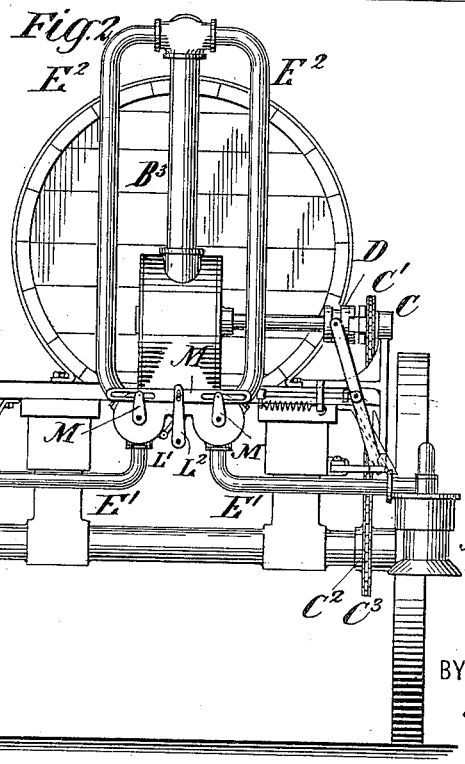
WITNESSES:
INVENTORS
ATTORNEY No. 622,547. Patented Apr. 4, 1899.
A. SHEDLOCK & J. A. HUDSON.
SPRINKLING APPARATUS.
(Application filed Feb. 21, 1898.)
(No Model.) 2 Sheets—Sheet 2.
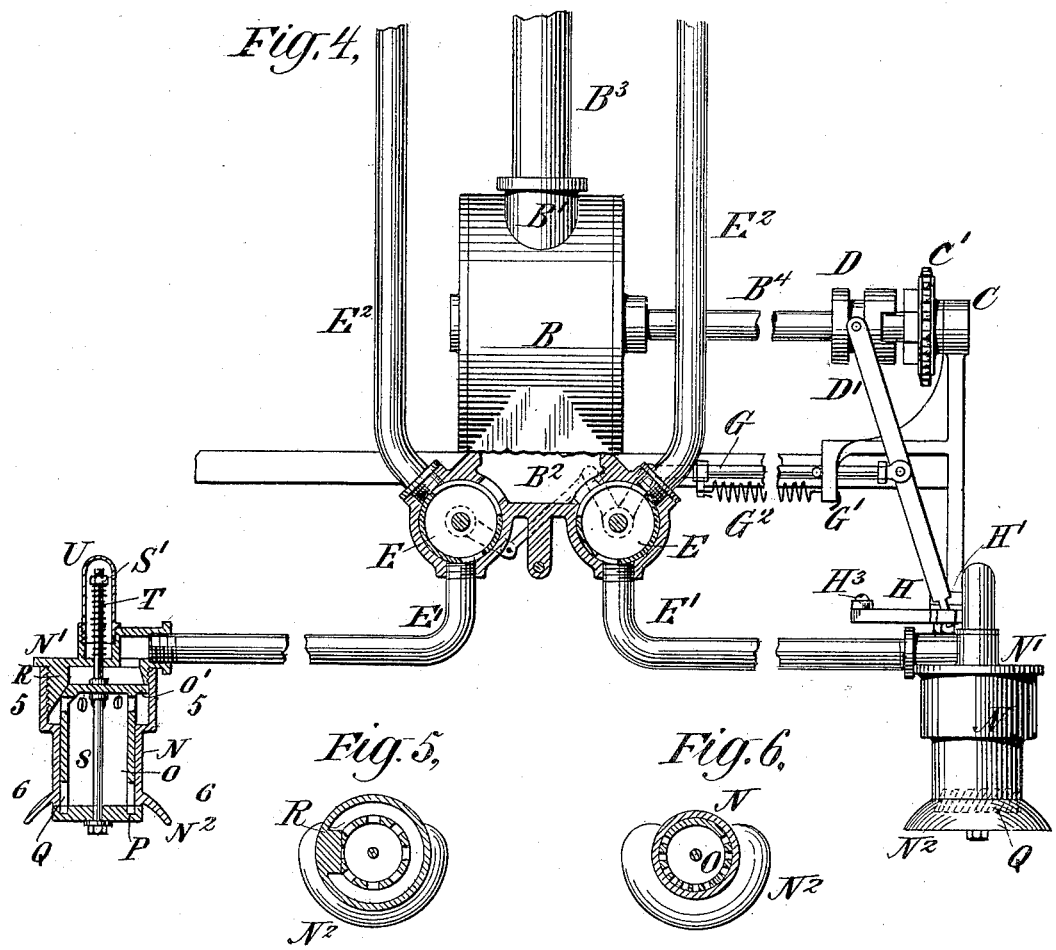
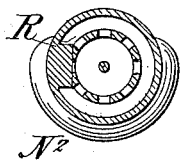
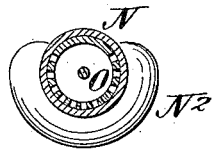
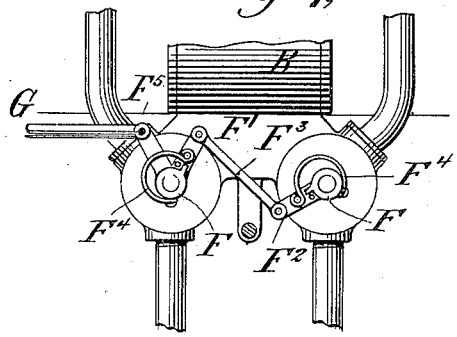
WITNESSES:
INVENTORS
Alfred Shedlock,
James A. Hudson
BY
Alfred Shedlock.
ATTORNEY

UNITED STATES PATENT OFFICE.

ALFRED SHEDLOCK, OF JERSEY CITY, NEW JERSEY, AND JAMES A. HUDSON, OF TARRYTOWN, NEW YORK.

SPRINKLING APPARATUS.

SPECIFICATION forming part of Letters Patent No. 622,547, dated April 4, 1899.

Application filed February 21, 1898. Serial No. 671,000. (No model.)

*To all whom it may concern:*

Be it known that we, ALFRED SHEDLOCK, residing at Jersey City, in the county of Hudson and State of New Jersey, and JAMES A. HUDSON, residing at Tarrytown, in the county of Westchester and State of New York, citizens of the United States, have invented a new and useful Sprinkling Apparatus, of which the following is a specification.

The sprinkling apparatus forming the subject of this invention comprises a portable water-holder which may be of any of the ordinary constructions, means for discharging the water or allowing it to flow from the holder in determined quantities, according to the different rates of transition of the water-holder, and a spraying device or spraying devices through which the water delivered at different rates by the measuring means is discharged under a uniform pressure.

The invention contemplates operating its means for measuring and discharging the water from the holder by a suitable gearing from some part of the running-gear of the holder, as a wheel or the wheels thereof, so that the speed of such water measuring or discharging device or devices will accord with the speed of the water-holder, thus causing practically a uniformity of water to be supplied to the space or area traveled over by the water-holder whatever may be the rate of speed of the holder; also, the use of mechanism for putting the measuring and delivering means into and out of action at will; also, means for varying the quantities of water delivered from the holder for the different given rates of transition of the holder; also, making the spraying device or spraying devices automatic in action in such manner that a practically constant pressure will be maintained at the discharge holes or openings thereof for all quantities of water supplied by the measuring means by causing the aggregates of the areas of the holes or openings exposed to accord with the different quantities of water supplied, thus insuring a uniform spread and distribution of water, regardless of the different rates of travel of the holder and for each given quantity of water supplied by the measuring means, and also means for cutting off the water from either one or more of two or more spraying devices connected to and supplied with water from one measuring device without changing the working condition of the other spraying device or spraying devices. In the application of these devices to a sprinkling apparatus a suitable method which may be used to advantage for varying the delivery capacity of the measuring device is to cause some of the water which passes through it to flow back to its inlet through a by-pass for each spraying device, and it is also advantageous to make use of a siphon-pipe for connection between the measuring device and the interior of the water-holder and to connect the by-pass or by-passes to the siphon-pipe at or near its upper bend, where the resistance to the back-flow of the water will be *nil* or practically constant, thus avoiding irregularities of action consequent to the change of head of water in the holder.

In the accompanying drawings we have illustrated a practical embodiment of our invention, and to them we will now refer to more fully describe the various devices suitable for the different parts of our invention and their combination and coöperation to produce a sprinkling apparatus having the characteristics above mentioned.

Figure 1 is a side elevation of a portable sprinkling apparatus embodying our invention with the near wheels removed. Fig. 2 is a rear end view of the same. Fig. 3 is a part front elevation showing the operating-levers. Fig. 4 is an enlarged view, partly in section, of the measuring device, the spraying devices, and water controlling and operating mechanisms. Fig. 5 is a transverse section of one of the spraying devices, taken on line 5 5, Fig. 4. Fig. 6 is a similar section taken on line 6 6; and Fig. 7 is a reverse view of the part of Fig. 4, showing the levers of the controlling-valves.

The portable water-holder A, to which our improvements are shown applied, is of the ordinary horse-power street-sprinkler construction, a seat and foot-rest A' being shown at the front end for the driver. The means for drawing the water from the holder in measured quantities is here shown as a rotary pump B, secured to the rear end of the holder A and having its inlet at B' and its outlet in the discharge-chamber B². The inlet B' is by preference placed in communication with the interior of the holder by the siphon-pipe B³, which extends upwardly from the pump to the top of the holder A and downwardly into the holder, its suction end being provided with a suitable screen. The inlet of this pump may be directly connected to the lower part of the holder; but some advantages accrue from the use of the form of connection shown in that joints of connection to the tank or holder will be avoided and a uniform resistance will be opposed to the flow of the returned excess of water by discharging it in the siphon at its bend.

The shaft B⁴ of the pump B has at its outer end a bearing C, which extends upwardly from the frame of the wagon, and on this end of the shaft, adjacent to the bearing C, is fitted to rotate freely a sprocket-wheel C', connected by a chain C² to a sprocket-wheel C³, secured to the hub of one of the wheels of the wagon. A sliding clutch D on the shaft B⁴, controlled by the lever D', locks the shaft to the sprocket-wheel C', which has on its side teeth corresponding to those of the clutch, so that the pump may be put into and out of action as desired. A chain-and-sprocket-wheel connection is here adopted as the power-communicating medium. Other forms of gearing may be used, and it will also be understood that the pump may be actuated from any suitable moving part of the apparatus if steam or other motive power be employed to move the water-holder.

Two spraying devices are shown arranged to receive water from the one discharge-chamber of the measuring-pump B, the two outlets of said chamber B² opening into valve-chests in which are fitted the hollow rotating valves E E, so constructed as to partly close the openings to the spraying supply-pipes E' E' and the openings to the by-pass or return pipes E² E², as shown in Fig. 4, and to be manipulated to entirely close the openings of the pipes E' E' and leave the openings of the pipes E² E² fully open, and vice versa. The by-pass or return pipes E² E² connect with the siphon-pipe B³ at its bend. They may connect directly with the inlet B' of the pump or open into the water-tank A; but it is preferred to return that portion of the water which is passed by the measuring-pump and is not required for use at the spraying devices to the bend of the siphon-pipe, where the pressure of the water under suction is uniform, and consequently a uniform resistance will be offered to the flow of the return water through the pipes E² E², thus causing a positive amount of water to flow through the pipes E' E' for each of the working positions in which the valves E E may be set.

On the forward ends of the stems of the valves E E are secured collars F F, and inside the collars, fitted loosely on the stems, are the levers F' and F², the ends of which are connected together by the link F³. Springs F⁴ F⁴ and stop-pins join the levers F' and F² to their respective collars F F, the arrangement being such that when the levers F' F² are operated the valves are caused to move with them; but the valves may be partly rotated against the resilience of the springs without causing any disturbance of the levers. From the lever F' projects the arm F⁵, to the end of which is connected the rod G, fitted to slide in the bearing G' and connected at its other end to the central part of the lever D'. The spring G² holds the rod G and the valves E E in the position they occupy in Fig. 4, which is their normal positions—that is, with the openings to the pipes E' E' and E² E² partly closed—the clutch D in said view also being shown open or clear of the sprocket-wheel C'. The lower end of the lever D' is engaged by one part of the bell-crank lever H, which is pivoted to the downwardly-projecting post H', the other arm of said bell-crank lever being joined by the rod H³ to the bell-crank lever H², located at the front part of the wagon. This bell-crank lever H² is by the rod H⁴ connected to the foot-lever I, pivoted in a suitable bearing on the foot-rest A' of the wagon. The foot-lever I is provided with a notched or toothed quadrant I', and adjacent thereto is a pawl or dog I², which engages with the teeth of the quadrant when the foot-lever is depressed by the operator. The dog I² is adapted to be moved away from the quadrant by the foot of the operator. On the foot-rest of the platform A' is also secured a rocking lever J, having a foot-piece on either side of the fulcrum, and from one of its arms a rod K extends downwardly and is connected to a crank-arm L, secured to the end of the shaft L', located and having bearings beneath the holder A, with its rear end projecting beyond the chests of the valves E E, and to this end is secured an arm L². To the rear ends of the stems of the valves E E are secured arms M M, provided with studs which pass through slots in the link M', the central part of said link being connected, by means of a pin and slot, to the end of the arm L². The slots in the link M', which embrace the studs of the arms M M, are of such a length and so arranged that the arms M M are free to move with the valves E E when they are actuated by the rod G without their studs striking the ends of said slots; but the link M' when moved in either direction by the arm L² will carry with it the outer end of the arm M of the valve E, toward which the said link is caused to travel, thereby rotating the said valve to close the opening of its pipe E' and fully expose the opening of its pipe E² without disturbing or causing the other valve to be rotated.

Each of the automatic spraying devices comprises a body-piece N, having an enlarged upper end, which is covered by a cap N', to which the supply-pipe E' is attached, and the lower end is provided with a deflector or water-spreading shield N². A sleeve O is fitted to slide in the body N, its upper end being provided with a piston-head O', which fits in the enlarged end of the body, and to the lower end of the sleeve is applied a cap or cover P, which closes against the open end of the body when the water-supply is cut off from the spraying device. A series of slots Q are formed through the sleeve O just above its cover P, and they are more or less exposed as the sleeve is forced out of the body. The water as it issues from them meets the deflector $N^2$, and is thereby broken or dispersed in fine drops or spray. These slots Q are preferably inclined or spirally formed through the sleeve, as shown by the dotted lines in the right-hand spraying device of Fig. 4. The piston-head O' has an opening formed through it which embraces a taper lug or projection R, attached to the body N or to its cap N'. This opening and taper lug may be multiplied in number, if desired, one only being here shown as sufficient in some cases for the purpose of allowing the proper quantity of water to flow to the interior of the sleeve from the pipe E'. Holes are formed through the sleeve O just beneath the piston-head to allow a free passage of the water from the under side of the head to the interior of the sleeve. A rod S, centrally secured in the piston-head O', extends down through the cover P, said cover being held on the sleeve O by means of a nut on the end of the rod. This provides for speedy removal of the cover for the purpose of cleaning the interior of the sleeve O. Round holes may be substituted for the slots; but obstructions can be more easily removed from the discharge-slots than from round holes. The rod S also extends upwardly through the cap N' of the body and through the spring T, the upper end of the rod being provided with an adjusting-nut S', which bears on the upper end of the spring, the resilience of which holds the sleeve O in the body N and determines the distance the sleeve can be forced out by the water acting on the piston-head O'. To avoid the necessity of close fitting or the use of packing where the rod S passes through the cap N', the projecting end of the rod and the spring T are covered by the thimble U. This protects the spring and also the nut from liability of being shifted. The strength of the spring T is such and it is so adjusted that for the given pressure of the water acting on the piston-head O' the size of the opening through the head, which is governed by the taper-lug R for the different distances the sleeve O is forced out of the body, will bear such relation to the aggregate of the areas of the discharge-slots exposed so that a uniform pressure will be maintained at said openings whatever may be the rate of supply of the water to the spraying device.

The operation is as follows: The measuring-pump being inactive, except when sprinkling is being done, no water is allowed to pass from the holder, and such water as may be in the pipes and spraying devices is prevented from escaping by reason of the discharge-orifices and the lower ends of their bodies being protected by the covers on the ends of the sleeves. A free discharge of water takes place as soon as the pump is put into action, which is accomplished by a depression of the foot-lever I, the first part of the movement of which causes the shaft of the pump to be connected to the driving mechanism through the medium of the lever D', whose fulcrum at such time is its connection with the sliding rod G. Under this condition the valves E E are held so that the least quantity of water required, or that quantity of water desired for the lightest sprinkling, is allowed to pass to the spraying device, the excess supplied by the pump being returned to the supply-pipe of the pump through the by-pass pipes, the openings of the valves being so adjusted that a given proportion of the water is returned for all rates of transition of the apparatus and corresponding speeds of the pump. The further depression of the foot-lever I changes the character of the lever D'. Its connection to the clutch D now becomes its fulcrum, and the power is applied to move the rod G against its spring $G^2$, thereby rotating the valves E E to more fully open the discharge to the pipes E' E' and correspondingly close the openings of the by-pass pipes $E^2 E^2$, thus increasing the density or heaviness of the sprinkling in any desired number of gradations up to the full capacity of the pump, which will be when the openings of the by-pass pipes $E^2 E^2$ are entirely closed and those of the supply-pipes E' E' fully opened. The valves E E may be locked or held in any desired position by the dog $I^2$ acting on the quadrant I'. When it is desired to stop sprinkling from one of the spraying devices, the arm $I^2$ is by the manipulation of the lever J rocked over toward the valve of said spraying device it is desired to put out of action. This movement of the arm $I^2$, through the medium of the link M' and the arm M, connected to this valve, causes a rotation of the valve, so as to close the opening of the supply-pipe E' and fully open the by-pass $E^2$, thus allowing the water cut off from the supply-pipe E' to flow back to the source of supply.

We claim as our invention—

1. A sprinkling apparatus, consisting of a portable water-holder, a spraying device or spraying devices in communication with the interior of the holder and constructed to automatically discharge different quantities of water at a practically uniform pressure, and means for delivering water from the holder to the spraying device or spraying devices and actuated by and proportionately to the rate of transition of the holder.

2. A sprinkling apparatus, consisting of a portable water-holder, a measuring-pump having its inlet in communication with the interior of the holder and actuated to deliver water therefrom when it is in motion and in amount proportionately to the rates of its transition, and an automatic spraying device attached to the outlet of the measuring-pump adapted to discharge the different amounts of water supplied thereto by the pump at a practically uniform pressure.

3. A sprinkling apparatus, consisting of a portable water-holder, a measuring-pump having its inlet in communication with the interior of the holder and actuated to deliver water therefrom when it is in motion and in amounts proportionately to the rates of its transition, and an automatic spraying device attached to the outlet of the measuring-pump adapted to discharge the different amounts of water supplied thereto by the pump at a practically uniform pressure, and means for putting the measuring-pump into and out of action at will.

4. A sprinkling apparatus, consisting of a portable water-holder, a measuring-pump having its inlet in communication with the interior of the holder and actuated to deliver water therefrom when it is in motion in amounts proportionately to the rates of its transition, an automatic spraying device attached to the outlet of the measuring-pump adapted to discharge the different amounts of water supplied thereto by the pump at a practically uniform pressure, means for putting the measuring-pump into and out of action at will, and means for varying the delivery capacity of the pump.

5. A sprinkling apparatus, consisting of a portable water-holder, a measuring-pump having its inlet in communication with the interior of the holder and actuated to deliver water therefrom when it is in motion and in amounts proportionately to the rates of its transition, an automatic spraying device attached to the outlet of the measuring-pump adapted to discharge the different amounts of water supplied thereto by the pump at a practically uniform pressure, a by-pass from the outlet to the inlet of the pump, and a valve in said by-pass.

6. A sprinkling apparatus, consisting of a portable water-holder, a measuring-pump having its inlet in communication with the interior of the holder and actuated to deliver water therefrom when it is in motion and in amounts proportionately to the rates of its transition, an automatic spraying device attached to the outlet of the measuring-pump adapted to discharge the different amounts of water supplied thereto by the pump at a practically uniform pressure, a by-pass from the outlet to the inlet of the pump, a valve in said by-pass, and mechanism for effecting the operation of the pump and for controlling the valve in the by-pass.

7. A sprinkling apparatus, consisting of a portable water-holder, a spraying device or spraying devices in communication with the interior of the holder and automatically operative to discharge different quantities of water at a practically uniform pressure, and means located in a siphon-pipe for delivering water from the lower part of the holder to the spraying device or spraying devices and actuated by and proportionately to the rate of transition of the holder.

8. A sprinkling apparatus, consisting of a portable water-holder, a measuring-pump located in a siphon-pipe having its inlet in communication with the lower part of the interior of the holder and actuated to deliver water therefrom when it is in motion and in amounts proportionately to the rates of its transition, an automatic spraying device attached to the outlet of the measuring-pump adapted to discharge the different amounts of water supplied thereto by the pump at a practically uniform pressure, and means for varying the delivery capacity of the pump.

9. A sprinkling apparatus, consisting of a portable water-holder, a measuring-pump located in a siphon-pipe having its inlet in communication with the lower part of the interior of the holder and actuated to deliver water therefrom when it is in motion and in amounts proportionately to the rates of its transition, an automatic spraying device or spraying devices attached to the outlet of the measuring-pump adapted to discharge the different amounts of water supplied thereto by the pump at a practically uniform pressure, means for varying the delivery capacity of the pump, and means for varying the amounts of water delivered to the spraying device or spraying devices for given different rates of transition of the holder.

10. A sprinkling apparatus, consisting of a portable water-holder, a measuring-pump located in a siphon-pipe having its inlet in communication with the lower part of the interior of the holder and actuated to deliver water therefrom when it is in motion and in amounts proportionately to the rates of its transition, an automatic spraying device attached to the outlet of the measuring-pump adapted to discharge the different amounts of water supplied thereto by the pump at a practically uniform pressure, a by-pass from the outlet to the inlet of the pump, a valve in said by-pass, and mechanism for effecting the operation of the pump and for controlling the valve in the by-pass.

11. An automatic spraying device for sprinkling apparatus, comprising a body-piece with a water-inlet at one end, and open at the other end, a sleeve fitted to slide therein having discharge holes or openings through its side at its end near the open end of the body and normally held within the body by means of a spring, and a cap attached to the outer end of the sleeve to cover the open end of the body, the water delivered to the device acting against the spring of the sleeve to force it outwardly and expose its discharge-openings for the escape of the water therethrough.

12. An automatic spraying device for sprinkling apparatus, comprising a body-piece with a water-inlet at one end and open at the other end, a closed-end sleeve fitted to slide therein having discharge holes or openings through its side near the closed end and having a piston-head at its other end provided with an opening or openings through which the water can pass to the interior of the sleeve, and a spring for holding the sleeve within the body and normally closing the end of the body by the closed end of the sleeve.

13. An automatic spraying device for sprinkling apparatus, comprising a body-piece with a water-inlet at one end, and open at the other end, a sleeve fitted to slide therein having discharge holes or openings through its sides at its end near the open end of the body and normally held within the body by means of a spring, and a cap attached to the outer end of the sleeve to cover the open end of the body, the water delivered to the device acting against the spring of the sleeve to force it outwardly and expose its discharge-openings for the escape of the water therethrough, and means for maintaining a uniform pressure within the sleeve for all rates of delivery of the water to the device and for the corresponding aggregate areas of the discharge-openings exposed for the different quantities of water so delivered to the device.

14. An automatic spraying device for sprinkling apparatus, comprising a body-piece with a water-inlet at one end and open at the other end, and a closed-end sleeve fitted to slide therein having discharge holes or openings through its side near the closed end and having a piston-head at its other end provided with an opening or openings through which the water can pass to the interior of the sleeve, a spring for holding the sleeve within the body and normally closing the end of the body by the closed end of the sleeve, and a taper lug or taper lugs on the body extending in the opening or openings of the piston-head whereby the area of said opening or openings is gradually increased as the sleeve is forced outwardly by the pressure of the water against the resilience of the spring to variably expose the discharge-holes, the aggregate area of the discharge-holes exposed being always in excess of the area of the piston-head opening or openings so as to cause a uniform pressure to be maintained at the discharge-holes for all rates of discharge of water from the device.

15. An automatic spraying device comprising a body having a closed end at which the water is supplied a closed-end sleeve fitted to slide in the body, adapted to close the open end of the body and having obliquely-arranged slots formed through its periphery adjacent to its closed end, and a spring for holding the sleeve within the body and adjusted to permit of the sleeve being forced out of the body by the pressure of the water to expose the openings of the slots proportionately to the quantity of water supplied to the device.

16. An automatic spraying device comprising a body having a closed end at which the water is supplied, a closed-end sleeve fitted to slide in the body, adapted to close the open end of the body and having obliquely-arranged slots formed through its periphery adjacent to its closed end, a spring for holding the sleeve within the body and adjusted to permit of the sleeve being forced out of the body by the pressure of the water to expose the openings of the slots proportionately to the quantity of water supplied to the device, and a deflector or spreading shield arranged in front of the exposed discharge-slots.

17. An automatic spraying device comprising a body having a closed enlarged end at which the water is supplied, a closed-end sleeve fitted to slide in the body, adapted to close the open end of the body and having obliquely-arranged slots formed through its periphery adjacent to its closed end and an enlarged piston-head fitted to slide in the enlarged portion of the body and having an opening or openings surrounding a fixed taper lug or lugs in the body, and a spring for holding the sleeve within the body and adjusted to permit the sleeve being forced out of the body by the pressure of the water to expose the opening of the slots proportionately to the quantity of water supplied to the device.

18. An automatic spraying device for sprinkling apparatus comprising a body-piece with a water-inlet at one end and open at the other end, a sleeve fitted to slide therein having discharge holes or openings through its side at its end near the open end of the body and normally held within the body by means of a spring, and a detachable cap attached to the outer end of the sleeve to cover the open end of the body, the water delivered to the device acting against the spring of the sleeve to force it outwardly and expose its discharge-openings for the escape of the water therethrough, and means for maintaining a uniform pressure within the sleeve for all rates of delivery of the water to the device and for the corresponding aggregate areas of the discharge-openings exposed for the different quantities of water so delivered to the device.

19. An automatic spraying device comprising a body having a closed enlarged end at which the water is supplied, a closed-end sleeve fitted to slide in the body, adapted to close the open end of the body and having obliquely-arranged slots formed through its periphery adjacent to its closed end and an enlarged piston-head fitted to slide in the enlarged portion of the body and having an opening or openings surrounding a fixed taper lug or lugs in the body, a spring for holding the sleeve within the body and adjusted to permit the sleeve being forced out of the body by the pressure of the water to expose the opening of the slots proportionately to the quantity of water supplied to the device, and a deflector or spreading-shield arranged in front of the exposed discharge-slots.

20. A sprinkling apparatus consisting of a measuring-pump, two automatic spraying devices connected to its delivery end by separate pipes, and a by-pass or return-pipe joining each of the spraying-device pipes to a part of the water-supply of the pump at which there is a constant pressure and mechanism for effecting the return of some of the water passed through the pump to its supply by the by-passes or return-pipes, and causing all of the water to flow to the spraying devices by a closing of the by-passes or return-pipes.

21. A sprinkling apparatus consisting of a measuring-pump, two automatic spraying devices connected to its delivery end by separate pipes, and a by-pass or return-pipe joining each of the spraying-device pipes to a part of the water-supply of the pump at which there is a constant pressure and mechanism for effecting the return of some of the water passed through the pump to its supply by the by-passes or return-pipes, and causing all of the water to flow to the spraying devices by a closing of the by-passes or return-pipes and means for cutting off from either of the spraying devices its supply of water and allowing such supply of water to flow back through the by-pass or return-pipe of said cut-off spraying device.

22. A sprinkling apparatus consisting of a portable water-holder, a measuring-pump in connection therewith and adapted to be actuated by a moving part of the apparatus during its transition, spraying devices connected by pipes to the outlet of the pump, valves at the junctures of the pipes of the spraying devices and the outlet of the pump, and mechanism constructed and operated to first cause the pump to be actuated by the moving part of the apparatus and then to operate the valves to vary the quantity of water supplied to the spraying devices.

23. A sprinkling apparatus consisting of a portable water-holder, a measuring-pump in connection therewith and adapted to be actuated by a moving part of the apparatus during its transition, spraying devices connected by pipes to the outlet of the pump, by-pass or return-pipes connecting the outlet of the pump to its source of supply, valves at the junctures of the pipes of the spraying devices, the by-pass or return-pipes and the outlet of the pump, mechanism constructed and operated to first cause the pump to be actuated by the moving part of the apparatus and then to operate the valves to vary the quantity of water supplied to the spraying devices, and means for actuating either of the valves to stop the flow of water to its spraying device and direct it to the by-pass.

24. A sprinkling apparatus, consisting of a portable water-holder, a measuring-pump in connection with the holder, a clutch, one part of which is rotated by connection to a moving part of the apparatus and its other part to the shaft of the pump, spraying devices connected by pipes to the outlet of the pump, by-pass or return-pipes extending from the outlet of the pump to the source of its supply, valves at the junctures of the pipes and pump, a lever connected at one end to the moving part of the clutch and pivoted to a spring-actuated rod connected to the valves and means for actuating the lever.

25. A sprinkling apparatus, consisting of a portable water-holder, a measuring-pump in connection with the holder, a clutch, one part of which is rotated by connection to a moving part of the apparatus and its other part to the shaft of the pump, spraying devices connected by pipes to the outlet of the pump, by-pass or return-pipes extending from the outlet of the pump to the source of its supply, valves at the junctures of the pipes and pump, a lever connected at one end to the moving part of the clutch and pivoted to a spring-actuated rod connected to the valves by means of yielding attachments, means for actuating the lever, and means for moving either of the valves independently of the other.

Dated New York this 19th day of February, 1898.

ALFRED SHEDLOCK.
JAMES A. HUDSON.

Witnesses:
JAS. L. BARGER,
ARTHUR C. BLATZ.